United States Patent [19]

Paine

[11] 4,285,418
[45] Aug. 25, 1981

[54] FRICTION COUPLING CONTROL SYSTEM

[75] Inventor: John C. Paine, North Olmsted, Ohio

[73] Assignee: Towmotor Corporation, Mentor, Ohio

[21] Appl. No.: 116,742

[22] PCT Filed: Jan. 7, 1980

[86] PCT No.: PCT/US80/00017

§ 371 Date: Jan. 7, 1980

§ 102(e) Date: Jan. 7, 1980

[51] Int. Cl.³ .............................................. F16D 65/34
[52] U.S. Cl. ................................... 188/109; 180/273; 188/163; 192/9
[58] Field of Search ....................... 188/109, 161, 163; 180/273; 192/9

[56] References Cited

U.S. PATENT DOCUMENTS

| 2,170,172 | 8/1939 | Wemp | 192/99 R |
|---|---|---|---|
| 2,280,870 | 4/1942 | Thelander | 192/70.22 X |
| 2,974,752 | 3/1961 | Howard | 188/163 X |
| 3,017,965 | 1/1962 | Hill | 188/163 |
| 3,259,203 | 7/1966 | Ryskamp . | |
| 3,332,522 | 7/1967 | Dence . | |
| 3,487,451 | 12/1969 | Fontaine | 188/109 X |
| 3,892,294 | 7/1975 | Nieminski | 188/109 |
| 4,136,752 | 1/1979 | Friesen et al. | 180/273 |

FOREIGN PATENT DOCUMENTS 1235153  2/1967  Fed. Rep. of Germany ........ 192/99 R Primary Examiner—George E. A. Halvosa
Attorney, Agent, or Firm—Alan J. Hickman

[57] ABSTRACT

This invention relates to a control system (8) for moving a frictional coupling between an engaged (15) and disengaged (17) position. A power device (40) is provided for moving the frictional coupling (18) to the engaged position (15) in response to a control device (26) being at a first position (27) and the disengaged position (17) in response to the control device (26) being at the second position (29). A switch device (70) deactivates the power device (40) at the engaged (15) and disengaged (17) position of the coupling and a maintaining device (60) releasably maintains the coupling at the engaged (15) and disengaged (17) positions. Thus the brake is held in the engaged and disengaged positions in the absence of electrical power. The control system (8) is particularly useful on a lift truck (18) parking brake system.

9 Claims, 3 Drawing Figures

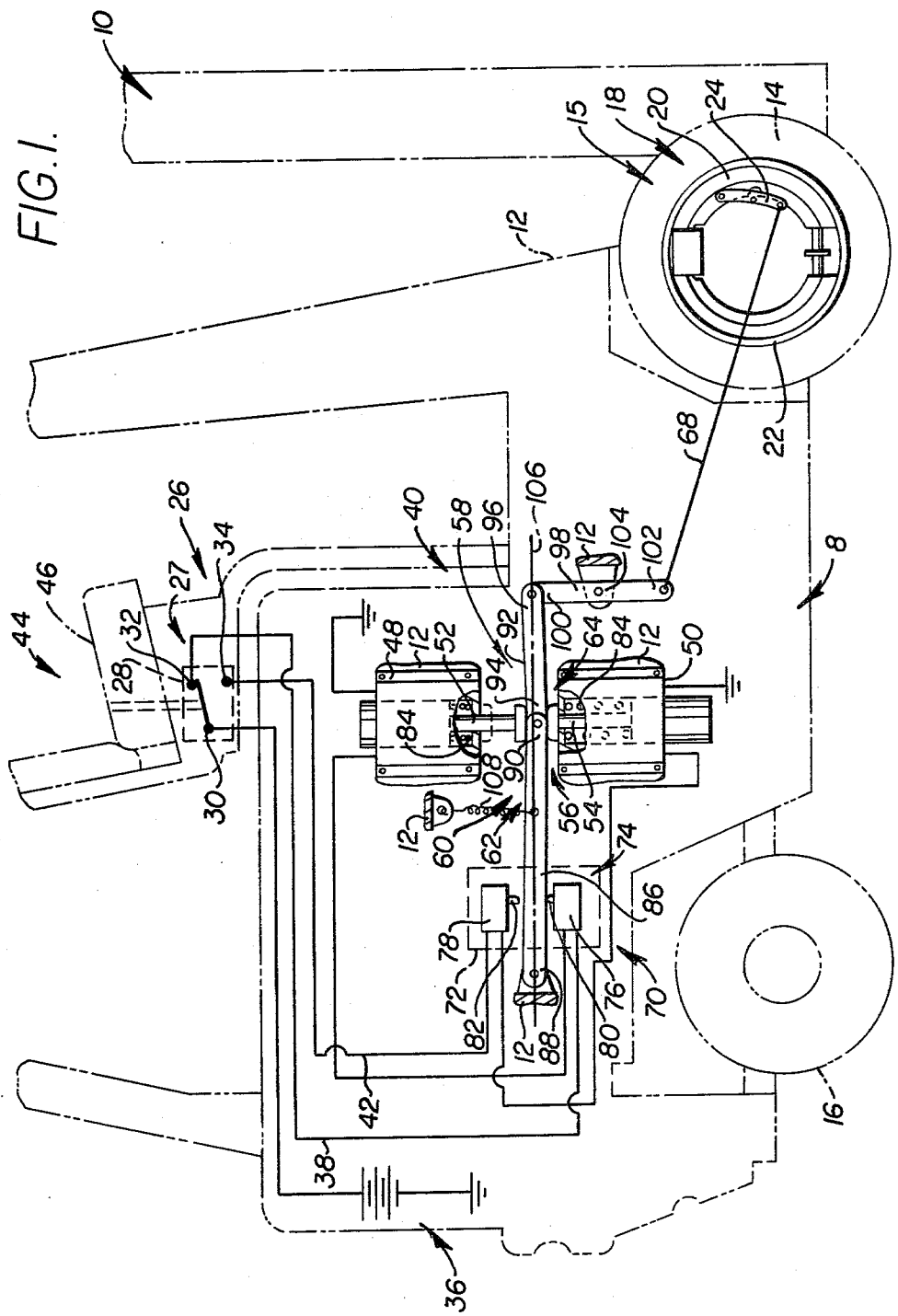

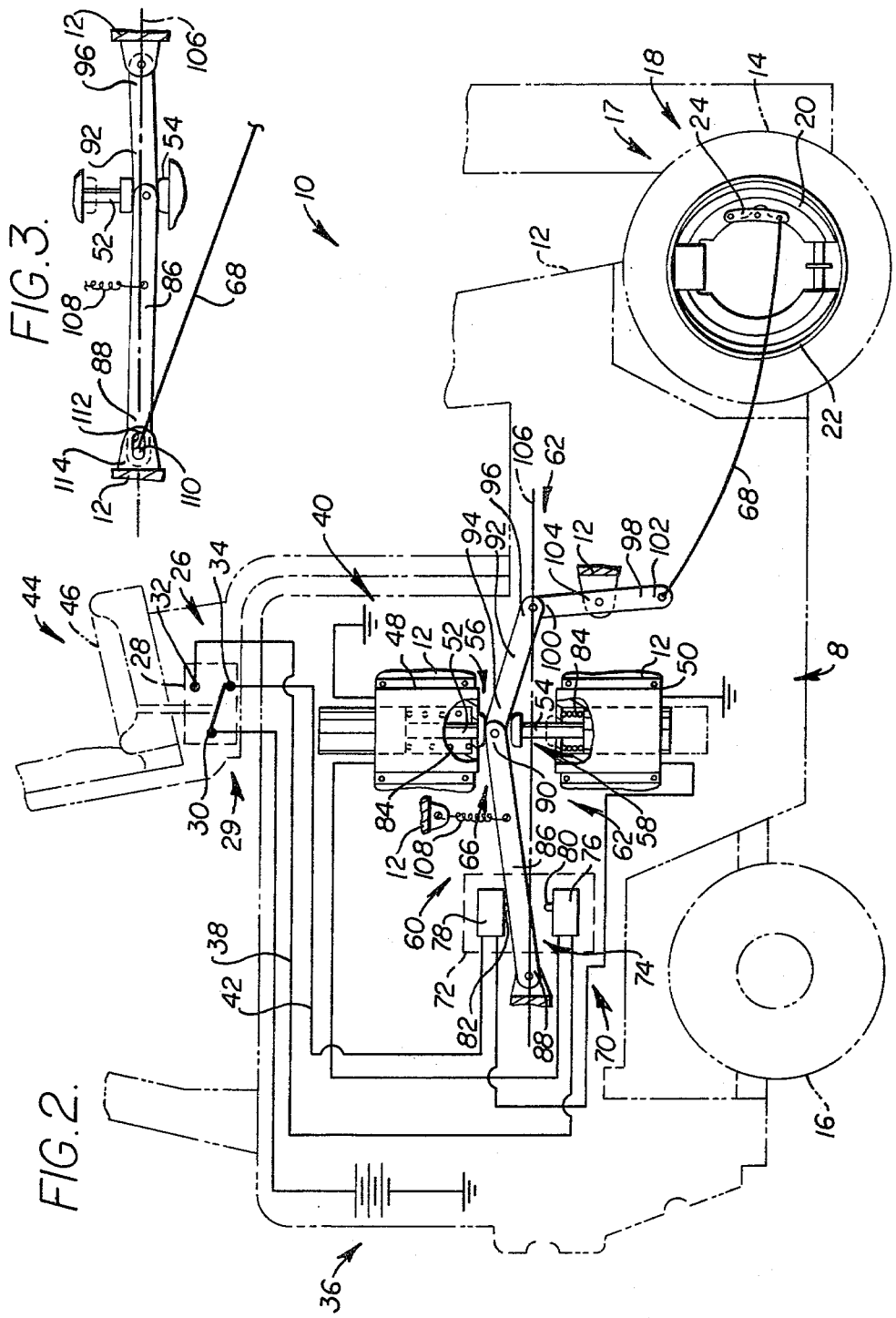

FRICTION COUPLING CONTROL SYSTEM

DESCRIPTION

1. Technical Field

This invention relates to a control system for moving a friction coupling between an engaged and disengaged position, and more particularly to a control system for moving a friction brake between an engaged and disengaged position in response to electrical power being delivered to a powering device; for deactivating the powering device at the engaged and disengaged position of the friction brake and for maintaining the friction brake in the engaged and disengaged position.

2. Background Art

A number of friction coupling systems such as a vehicle service brake are known that use a vehicle service brake as a parking brake. Such parking brakes have been known to be engaged and disengaged in response to the operators seat being unoccupied and occupied. U.S. Pat. No. 3,259,203, issued July, 5, 1966 to N. Y. Ryskamp and U.S. Pat. No. 3,892,294 issued July 1, 1975 to R. E. Nieminski are examples of such systems. Such systems are frequently controlled mechanically, hydraulically or electrically.

Many of the mechanical systems for controlling the brake require a substantial amount of space on the vehicle and frequently requires more space than available, especially when applied to a vehicle such as a lift truck. Often, these mechanical systems are operatively connected to the vehicle seat and moveable in response to pivotal motion of the seat for deactivating and actuating the vehicle brake. In some lift trucks the amount of pivotal seat motion is not adequate to move the linkage fully and to permit the use of a mechanical system. Therefore, other control systems such as electrical, hydraulic, or a hybrid mixture of electrical, hydraulic and mechanical must be utilized.

Typically an electrical, hydraulic or hybrid control systems such as U.S. Pat. No. 3,332,522 issued July 25, 1967 to D. S. Dence and U.S. Pat. No. 4,136,752 issued Jan. 30, 1979 to L. D. Friesen, et al, requires the use of electrical power or fluid power to move the brake to the engaged and disengaged position and to also maintain the brake in the engaged and disengaged position. The continuous provision of electrical or hydraulic power to maintain the brake in the engaged and disengaged position wastes energy and causes premature failure of the system.

DISCLOSURE OF THE INVENTION

The present invention is directed to overcoming one or more of the problems as set forth above.

In one aspect of the present invention, a friction coupling control system is provided for moving a friction coupling between an engaged and disengaged position. The friction coupling control system includes a friction coupling having an engaged and disengaged position, a power means for moving the friction coupling between the engaged and disengaged positions, means for deactivating said power means at the engaged and disengaged positions of the coupling, and means for releasably maintaining said coupling at the engaged and disengaged position.

BRIEF DESCRIPTION OF THE DRAWINGS

FIG. 1 is a diagrammatic view of a friction coupling control system with the friction coupling shown in the engaged position.

FIG. 2 is a diagrammatic view of a friction coupling control system with the friction coupling shown in the disengaged position.

FIG. 3 is a diagrammatic fragmented view of an alternate embodiment of the friction coupling control system shown in the engaged position.

BEST MODE FOR CARRYING OUT THE INVENTION

In accordance with the present invention, and with reference to the figures, a friction coupling control system 8 for a vehicle 10, for example a lift truck, having a frame 12, front and rear wheels 14,16 is shown. The wheels 14,16 are mounted on the frame 12 and rollingly engageable with the ground. A friction coupling 18, for example a friction brake, is mounted in the front wheels 14 and on the frame 12 and moveable between an engaged position 15 (FIG. 1) and disengaged position 17 (FIG. 2). The friction brake 18 includes a brake shoe assembly 20, brake drum 22 and a lever assembly 24.

The brake shoe assembly 20 is moveably connected to the frame 12. The brake drum 22 is rotatably connected to the vehicle frame 12 and supports the wheel 14 for rotation therewith. The lever assembly 24 is pivotally attached to the vehicle frame 12 and the brake shoe assembly 20 and pivotable to forcibly move the brake shoe assembly 20 between a friction brake engaged position 15 with said drum 22 and a friction disengaged position 17 with said drum 22. It is to be noted that other embodiments such as disc type brakes, clutches and the like are suitable equivalents for the shoe type brake described. Further, the specific shoe type brake described is one of many types commercially available and should not be construed as being limiting.

A control device 26 is provided on the vehicle 10 and moveable between a first position 27 corresponding to the friction coupling 18 engaged position 15 and a second position 29 corresponding friction coupling 18 disengaged position 17. The control device 26 preferably includes an electrical switch 28 having an input terminal 30 and first and second output terminals 32,34. The input terminal 30 is connected to a source of electrical power 36, such as a battery. The first output terminal 32 is connected to a first electrical circuit 38 of a power means 40 and the second output terminal 34 is connected to a second electrical circuit 42 of the power means 40.

The electrical switch 28 is mounted on the vehicle 10 adjacent an operators seat 44 and connected to the seat 44. As best seen in FIG. 2 the presence of the weight of an operator on a seat cushion 46 of seat 44 will move the switch 28 to the second position 29 and connect the input terminal 30 of the switch 28 to the second output terminal 34 of the switch 28. Therefore the source of electrical power 36 will be connected to the second electrical circuit 42 and the power means 40. As best seen in FIG. 1, in the absence of the weight of the operator from the seat 44, the seat cushion 46 will return to an unloaded position and cause the switch 28 to move to the first position 27 and connect the input terminal 30 of the switch 28 to the first output terminal 32 resulting in the connection of the electrical power source 36 to the first electrical circuit 38 and the power means 40.

The power means 40 is provided for moving the friction coupling 18 to the engaged position 15 in response to the control device 26 being at the first position 27 and for moving the friction coupling 18 to the disengaged position 17 in response to the control device being at the second position 29. The power means includes a first and second solenoid 48 and 50. The first solenoid 48 is connected to the first electrical circuit 38 and the second solenoid 50 is connected to the second electrical circuit 42. A plunger 52 is provided in the first solenoid 48 and a plunger 54 in the second solenoid 50. The plungers 52 and 54 are each independently moveable between a first position 56 and a second position 58 spaced from said first position 56. Preferably the first position 56 is a plunger retracted position and the second position 58 is a plunger extended position. The first and second solenoids 48,50 are each connected to frame 12 at a predetermined spaced apart distance from one another and with the plungers 52,54 facing one another.

A means 60 is provided for releasably maintaining the coupling 18 at the engaged position 15 and disengaged position 17. The means 60 includes a linkage assembly 62 moveable between a first over center position 64 (FIG. 1) and a second over center position 66 (FIG. 2). The linkage assembly 62 is connected to the friction coupling 18. More specifically the linkage assembly 62 is connected to the lever assembly 24 of the friction brake 18 by a cable 68. The friction coupling 18 is moveable between the engaged position 15 in response to the linkage assembly 62 being at the first over center position 64 and moveable to the disengaged position 17 in response to said linkage assembly 62 being at said second over center position 66. The linkage assembly 62 is moved by and in response to movement of the plungers. Specifically the linkage assembly 62 is forceably moved by the first plunger 52 to the first over center position 64 and by the second plunger 54 to the second over center position 66.

A means 70 is provided for deactivating the power means 40 at the engaged 15 and disengaged 17 positions of the coupling 18. The deactivating means 70 includes an electrical switch assembly 72 having a switch actuator 74. The switch actuator 74 is positioned adjacent the linkage assembly 62 and contactable and moveable by the linkage assembly 62. The deactivating means 70 more specifically includes a first switch 76 and a second switch 78. The first switch 76 is connected in the first circuit 38 and the second switch 78 is connected in the second circuit 42. The first switch 76 is of a construction sufficient for passing electrical power from the source 36 to the first solenoid 48 at one of the engaged positions 15 and disengaged position 17 of the friction coupling 18 and the second switch 78 is of a construction sufficient for passing electrical power from the source 36 to the second solenoid at the other of the engaged 15 and disengaged 17 positions of the friction coupling.

The first switch 76 is serially connected in first circuit 38 between the control device 26 and the first solenoid 48. The second switch 78 is serially connected in the second circuit 42 between the control device 26 and the second solenoid 50. The switches 76 and 78 are of a type well known in the art which has an open electrical power blocking position and a closed electrical power passing position. The first and second switches 76 and 78 are normally biased to the closed position in a conventional manner.

The switch actuator 74 comprises a first actuator plunger 80 on the first electrical switch 76 and a second actuator plunger 82 on the second electrical switch 78. The first and second actuator plungers 80 and 82 are each moveable by a force applied thereto for placing respective first and second electrical switches 76 and 78 in the open position.

The first and second electrical switches 76 and 78 are connected to the frame 12 of vehicle 10 at spaced apart locations with the first and second actuator plungers 80 and 82 facing one another and on opposed sides of the linkage assembly 62. The first and second actuator plungers 80 and 82 are each engageable by the linkage assembly 62. The first actuator plunger 80 is forceably engaged by the linkage assembly 62 at the first linkage over center position 64 and the second actuator plunger 82 is forceably engaged by the linkage assembly 62 at the second linkage over center position 66. With the linkage assembly 62 in the first over center position 64 (FIG. 1), the first actuator plunger 80 engaged and the first electrical switch 76 in the open position, electrical power from the source 36 to the solenoid 48 is blocked. Alternately, with the linkage assembly 62 in the second over center position 66 (FIG. 2), the second actuator plunger 82 engaged and the second electrical switch 78 in the open position, the electrical power from the source 36 to the solenoid 50 is blocked.

A return spring 84 is provided in each of solenoids 48 and 50. Each spring is engageable with respective first and second solenoid plungers 52 and 54 and respective first and second solenoids 48 and 50. The first and second plungers are each moveable between an extended and retracted position. In the absence of electrical power being delivered to the first and second solenoids 48,50 the springs 84 will bias the plungers 52 and 54 to the retracted position. Upon delivery of electrical power to the solenoids 48 and 50 the bias of springs 84 is overcome and the plungers 52,54 will be extended. Therefore, whenever the delivery of electrical power from the source 36 to the first solenoid 48 is prevented such as by moving the control device 26 to the second position 29, or the first switch 76 to the open position the first plunger 52 will be retracted. Likewise whenever the delivery of electrical power from the source 36 to the second solenoid 50 is prevented, such as by moving the control device 26 to the first position 27, or the second switch 78 to the open position the second plunger 54 will be retracted. The retracted position of the first plunger 52 provides a stop for the linkage assembly 62 when the linkage assembly 62 is at the second over center position 66 and prevents further movement of the linkage assembly in a direction toward the plunger 52. The retracted position of the second plunger 54 provides a stop for the linkage assembly 62 when the linkage assembly 62 is at the first over center position 64 and prevents further movement of the linkage assembly in a direction toward the plunger 54.

The linkage assembly 62 includes a first link 86 having a first end portion 88 and a second end portion 90, a second link 92 having a first end portion 94 and a second end portion 96, and a third link 98 having a first end portion 100 and a second end portion 102 and a middle portion 104. The first end portion 88 of the first link 86 is pivotally connected to the frame 12 in any suitable manner. The middle portion 104 of the third link 98 is pivotally connected to said frame in any suitable manner. The second end portion 102 of the third link 98 is connected to the friction coupling 18 by the cable 68 which was previously discussed. The first end portion 94 of the second link 92 is pivotally connected to the second end portion 90 of the first link 86 in any suitable manner and the second end portion 96 of the second link 92 is pivotally connected to the first end portion 100 of the third link 98 in any suitable manner. A plane 106 extending through the first end portion 88 of the first link 86 and the second end portion 96 of the second link 92 is closer to one of the first and second 48,50 solenoids than the other. It is to be noted that plane 106 defines a boundry between respective first and second over center positions 64,66. Specifically, the plane 106 is closer to solenoid 50 than solenoid 48. This is necessitated by the fact that the linkage 62 must be only slightly over center in the first over center position 64. If the pivotal connection of the first end portion 94 of the second link 92 and the second end portion 90 of the first link 86, when the linkage assembly 62 is in the first over center position 64, passes the plane 106 too great a distance the geometry of the linkage assembly will cause the cable to slacken resulting in too little or no engagement of the friction coupling 18. Therefore there is a predetermined range of positions when adequate tension is provided in cable 68 for the desired amount of coupling engagement.

A biasing means such as a tension spring 108 is connected to the first link 86 between the first and second end portions 88,90 and the vehicle frame 12 and urges the linkage assembly 62 toward the second over center position 66 and maintains the linkage assembly 62 in the second over center position 66 when there is no tension in the cable 68 and to prevent inadvertent engagement of the friction coupling 18 during operation of the vehicle. It is to be noted that the linkage assembly functions on a balance between the tension in cable 68 and the bias of spring 108. The tension in cable 68 is adequate to maintain both the linkage assembly 62 in the first over center position 64 and the friction coupling engaged, and the spring 108 is adequate to maintain the linkage assembly 62 in the second over center position 66 and the friction coupling 18 disengaged.

It is preferred that the pivotal connection of the second end portion 90 of the first link 86 and the first end portion 94 of the second link 92 be positioned at a location substantially in alignment with an axis defined by the first and second plungers 52,54.

Referring to an alternate embodiment, as shown partially in FIG. 3, the friction coupling control system 8 is substantially the same as shown in FIGS. 1 and 2 with the exception that linkage assembly 62 has been modified in the following manner. The first end portion 88 of the first link 86 has a pin 110 affixed thereto. The pin is slidably disposed in a slot 112 of a bracket 114 which is rigidly affixed to the frame 12. The cable 68 is connected to the pin 110 in any suitable manner rather than to third link 98 and the third link 98 has been deleted. The second end portion 96 of the second link 92 is pivotally connected to the frame 12 in any suitable manner.

INDUSTRIAL APPLICABILITY

In operation, with the linkage assembly 62 in the first over center position 64 and the brake 18 applied the operator of the vehicle 10 mounts the seat 44. The weight of the operator on the seat 44 causes the control device 26 to move to the second position 29 wherein the switch 28 connects the source of electrical power 36 to the second electrical circuit 42 by connecting the input terminal 30 of switch 28 to the second output terminal 34 of switch 28. When the control device 26 is in the second position 29 no electrical power is passed to the first electrical circuit 38. The electrical power from the source 36 is passed by the second electrical circuit 42 through the second switch 78 to the second solenoid 50 of power means 40. The second solenoid 50 upon receipt of electrical power from the source 36 will cause plunger 54 to move to the extended or second position 58 against the bias of spring 84. The force of the plunger 54 against the linkage assembly 62 while extending will move the linkage assembly 62 from the first over center position 64 wherein the brake 18 is engaged, across the plane 106 to the second over center position 66 and to rest against the plunger 52 of the first solenoid 48. It is to be noted that in the absence of electrical power at the first solenoid 48 the plunger 52 of the first solenoid 48 will be held in the retracted or first position 56 under the bias of spring 84. Upon movement of the linkage assembly 62 towards the plunger 52, and the second over center position 66, the third link 98 will pivot about its middle portion 104 and the second end portion 102 of the third link 98 will move closer to the brake 18 causing the cable 68 to slacken. The absence of tension in cable 68 will permit the lever assembly 24 to relax resulting in disengagement of the brake shoe assembly 20 with the brake drum 22.

The spring 108 will provide adequate tension to maintain linkage assembly 62 in the second over center position 66 and at rest against the plunger 52. The linkage assembly 62 and specifically the first link 86 engages the actuator plunger 82 of the second switch 78 and biases the switch 78 to the open position at which electrical power from the source 36 to the solenoid 50 is blocked and the plunger 54 of the solenoid 50 is retracted under the bias of spring 84 to the first position 56.

Thus it can be seen that the linkage assembly 62 will remain in the second over center position 66, and the brake 18 disengaged even though there is no electrical power delivered to either one of the first and second solenoids 48,50 of the power means 40.

Conversely, the absence or removal of the weight of the operator from the seat 44 will cause the control device 26 to move to the first position 27 wherein electrical power from the source will be delivered by the first electrical circuit 38 to the first solenoid 48 of the power means 40. The plunger 52 will extend to the second position 58 and move the linkage assembly 62 across the plane 106 to the first over center position 64 against the retracted plunger 54. In this position the second end portion 102 of the third link 98 is furthest away from the brake 18 and the tension in cable 68 forces the lever assembly 24 to place the brake shoe assembly 20 into friction engagement with the brake drum 22. With the brake 18 in the engaged position 15 and the linkage assembly 62 in the first over center position 64 the means for deactivating 70 the power means 40 is actuated by the linkage assembly 62, preventing the passing of electrical power from the source 36 through the first electrical circuit 38 to the solenoid 48 of the power means 40 resulting in retraction of plunger 52 of solenoid 48 under the bias of spring 84.

The brake 18 will remain in the brake engaged position 15 as the tension in cable 68 will be maintained by the linkage assembly 62 being in the first over center position 64 and in abutment with the plunger 54 at the first retracted position 56.

The alternate embodiment, as shown in FIG. 3, operates substantially in the same manner as described above. However, over center movement of the linkage assembly 62 will result in linear motion of the pin 110 in the slot 112. The brake 18 will be engaged when the pin 110 is furthest away from the brake 18 and there is tension in cable 68 and disengaged when the pin 110 is closest to the brake 18 and the cable is slack.

Other aspects, objects and advantages of this invention can be obtained from a study of the drawings, the specification and the appended claims.

I claim:

1. A friction coupling control system (8) having a frame (12), a friction coupling (18) mounted on said frame (12) and being movable between an engaged (15) and disengaged (17) position, comprising:
   a control device (26) movable between a first position (27) corresponding to a friction coupling engaged position (15) and a second position (29) corresponding to a friction coupling disengaged position (17);
   power means (40) for moving the friction coupling (18) to said engaged position (15) in response to said control device being at said first position (27), and for moving the friction coupling to said disengaged position (17) in response to said control device being at said second position (29), said power means (40) includes first (48) and second (50) solenoids each having a plunger (52,54), said solenoids being positioned a predetermined spaced apart distance from one another and in a plunger facing relationship;
   means (70) for deactivating said power means (40) at the engaged (15) and disengaged (17) positions of the friction coupling (18);
   means (60) for releasably maintaining said friction coupling (18) at the engaged (15) and disengaged (17) position;
   said maintaining means (60) includes a linkage assembly (62) being movable between first (64) and second (66) over center positions, said friction coupling (18) being connected to said linkage assembly (62) and movable to said engaged position (15) in response to said linkage assembly (62) being moved to said first over center position (64) and movable to said disengaged position (17) in response to said linkage assembly (62) being moved to said second over center position (66);
   said linkage assembly (62) includes a first link (86) having first (88) and second (90) end portions, a second link (92) having first (94) and second (96) end portions and a third link (98) having first (100) and second (102) end portions and a middle portion (104), the first end portion (88) of the first link (86) being pivotally connected to said frame (12), the middle (104) portion of the third link (98) being pivotally connected to said frame (12), the second end portion (102) of the third link (98) being connected to said friction coupling (18), and the first end portion (94) of the second link (92) being pivotally connected to said second end portion (90) of said first link (86) and the second end portion (96) of the second link (92) being connected to the first end portion (100) of said third link (98), a plane (106) extends through the first end portion (88) of the first link (86) and the second end portion (96) of the second link (92), and between the first (48) and second (50) solenoids, said plane (106) being closer to one of the solenoids than the other; and
   said plungers (52,54) being controllably movable between a retracted position and an extended position, said plungers (52,54) being of a construction sufficient for moving the first (86) and second links (92) through said plane (106) in response to movement of either one of said plungers (52,54).

2. In a vehicle (10) having a brake control system (8), a brake (18) movable between engaged and disengaged positions, a seat (44,46), and an electrical switch (28) movable between first (27) and second (29) positions in response to a load being removed from and being placed on said seat, the improvement comprising:
   a linkage assembly (62) having first (64) and second (66) over center positions and being connected to said brake (18) and said vehicle (10), said linkage assembly (62) being movable between a first over center position (64) at which said brake is engaged (15) and a second over center position (66) at which said brake is disengaged (17);
   first and second electrical circuits (38,42) and first and second solenoids (48,50), each connected in a respective electrical circuit (38,42), said first and second electrical circuits (38,42) each being connected to said seat responsive electrical switch (28) and to a respective one of said first and second solenoids (48,50);
   said first and second solenoids (48,50) being connected to said vehicle (10) at spaced apart positions and on opposite sides of said linkage assembly (62);
   said first solenoid (48) being actuated in response to said seat responsive switch (28) being in one of said first and second positions (27,29) and the other of said solenoids (50) being actuated in response to the seat responsive switch (28) being in the other of said first and second positions (27,29), said solenoids being of a construction sufficient for moving said linkage assembly (62) between said first and second over center positions (64,66); and
   means (70) for deactivating one of said first and second solenoids (48,50) in response to said linkage assembly (62) being at one of said first (64) and second (66) over center positions.

3. The brake control system (8), as set forth in claim 1, wherein said deactivating means (70) includes a first switch (76) being connected in said first circuit (38) and actuatable by said linkage assembly (62) moving toward said first over center position (64);
   a second switch (78) being connected in said second electrical circuit (42) and actuatable by said linkage assembly (62) moving toward said second over center position (66);
   said first switch (76) being of a construction sufficient for deactivating said first solenoid (48) at the first over center position (64) of said linkage assembly (62), and said second switch (78) being of a construction sufficient for deactivating said second solenoid (50) at the second over center position (66) of said linkage assembly (62).

4. In a lift truck (10) having a parking brake control system (8), a friction parking brake (18) moveable between a brake engaged (15) and disengaged (17) position, a seat (44), and an electrical switch (28) moveable between a first and second position (27,29) in response to deflection of said seat (44), the improvement comprising:

a linkage assembly (62) having a first (64) and second (66) over center position and being connected to said brake (18) and said vehicle (10), said linkage assembly (62) being moveable between a first position (64) at which said brake is engaged (15) and a second position (66) at which said brake is disengaged (17);

said linkage assembly (62) being of a construction sufficient for maintaining said brake (18) at the engaged position (15) at the first over center position (64) and for maintaining said brake at the disengaged position (17) at the second over center position (66);

a first electrical circuit (38) having a first solenoid (48) and being connected to said first solenoid (48) and said switch (28), said first solenoid (48) being actuatable in response to said switch (28) being at said first position (27) and said first solenoid (48) being engageable with said linkage assembly (62) and being of a construction sufficient for moving said linkage assembly (62) to the first position (64);

a second electrical current (42) having a second solenoid (50) and being connected to said second solenoid (50) and said switch (28), said second solenoid (50) being actuatable in response to said switch (28) being at said second position (29) and said second solenoid (50) engageable with said linkage assembly (62) and being of a construction sufficient for moving said linkage assembly (62) to said second position (66); and a switch assembly (72) connected to said first (28) and second circuits (42) and actuatable by said linkage assembly (62) at said first (64) and second positions (66) of said linkage assembly (62), said switch being of a construction sufficient for deactivating said first and second solenoids (48,50).

5. A friction coupling control system (8) having a frame (12), a friction coupling (18) mounted on said frame (12) and being movable between an engaged (15) and disengaged (17) position, comprising:

a linkage assembly (62) having first (64) and second (66) over center positions and being connected to said friction coupling (18) and said frame (12), said linkage assembly (62) being movable between a first over center position (64) at which said friction coupling (18) is maintained at the engaged position (15) and a second over center position (66) at which said friction coupling (18) is maintained at the disengaged position (17);

an electrical switch (28) having a first and second position (27,29) and being movable between said first and second positions (27,29);

first and second electrical circuits (38,42) and first and second solenoids (48,50), said first electrical circuit (38) being connected to said first solenoid (48) and said electrical switch (28) and said second electrical circuit (42) being connected to said second solenoid (50) and said electrical switch (28), said first solenoid (48) being actuatable in response to said electrical switch (28) being at one of said first and second positions (27,29) to move said linkage assembly (62) to one of said first and second over center positions (64,66) and said second solenoid (50) being actuatable in response to said electrical switch (28) being at the other of said first and second positions (29,27) to move said linkage assembly (62) to the other of said first and second over center positions (64,66); and means (70) for deactivating one of said first and second solenoids (48,50) in response to actution of said deactivating means by said linkage assembly (62) at one of said first (64) and second (66) over center positions of said linkage assembly and for deactivating the other of said first and second solenoids (50,48) in response to actuation of said deactivating means by said linkage assembly (62) at the other of said first (64) and second (66) over center positions of said linkage assembly.

6. The friction coupling control system (8) as set forth in claim 5, wherein said deactivating means (70) includes an electrical switch assembly (72) having a switch actuator (74), said switch actuator (74) being contactable by said linkage assembly (62) and movable in response to said linkage assembly (62) being moved toward said first and second over center positions (64,66), said switch assembly being actuatable by said switch actuator (74) at said first and second over center positions (64,66) of said linkage assembly (62).

7. The friction coupling control system (8) as set forth in claim 6 includes a source of electrical power (36) and said switch (28) has an input terminal (30) and first and second output terminals (32,34), said input terminal being connected to said source (36) and said first and second output terminals (32,34) being connected to said first and second circuits (38,42) respectively.

8. The friction coupling control system (8) as set forth in claim 7, wherein said electrical switch assembly (72) includes first and second switches (76,78) connected to respective ones of said first and second circuits (38,42) and said switch actuator (74) includes a first and second actuator plunger (80,82) on respective ones of said first and second switches (76,78), said first switch (76) being actuatable to block the passing of electrical power to said first solenoid (48) at one of the first and second over center positions (64,66) of said linkage assembly (72) and said second switch (78) being actuatable to block the passing of electrical power to said second solenoid (50) at the other of said first and second over center positions (64,66) of said linkage assembly (62).

9. The friction coupling control system (8) as set forth in claim 5 wherein said first and second solenoids (48,50) each have a respective plunger (52,54), said solenoids (48,50) being connected to said frame (12) adjacent said linkage assembly (62) a preselected spaced apart distance from one another and in a plunger facing relationship, said plungers (52,54) each being controllably movable between a retracted and extended position and contactable with said linkage assembly (62), said linkage assembly (62) being movable between said first and second over center positions (64,66) in response to extension of said plungers (52,54).

* * * * *